May 29, 1923.
I. BROBERG
BALANCING DEVICE BETWEEN TWO-COUPLED CARRIAGES FOR EFFECTING DESIRED WHEEL PRESSURE
Filed April 13, 1922 — 2 Sheets-Sheet 1
1,456,587
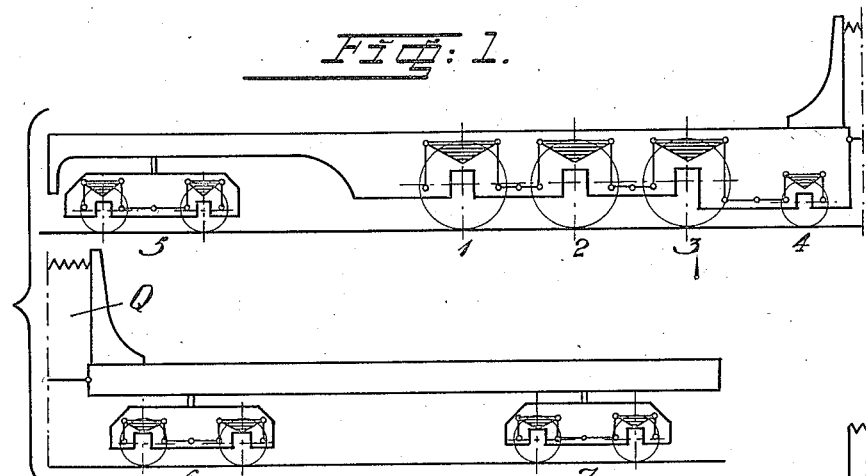
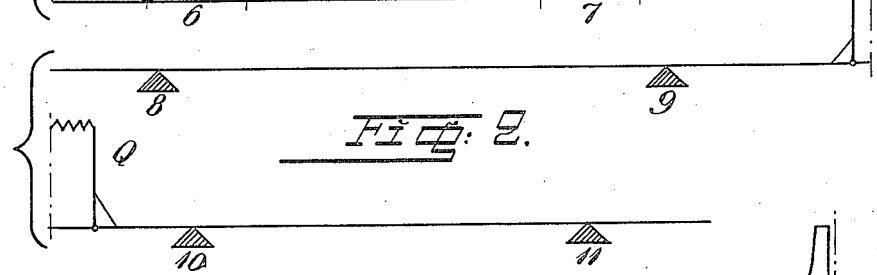
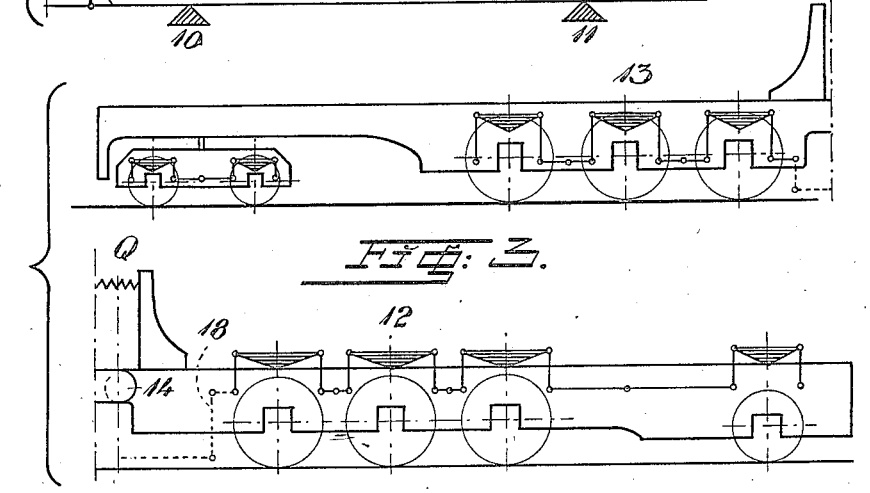
Inventor
I. Broberg,
By Marks&Clerk
Attys.

May 29, 1923.
I. BROBERG
BALANCING DEVICE BETWEEN TWO-COUPLED CARRIAGES FOR EFFECTING
DESIRED WHEEL PRESSURE
Filed April 13, 1922   2 Sheets-Sheet 2
1,456,587
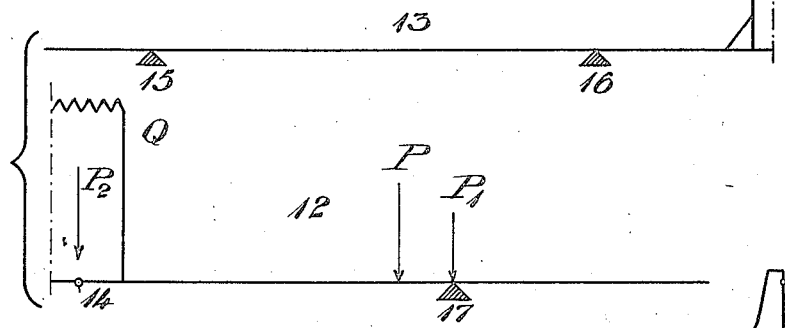
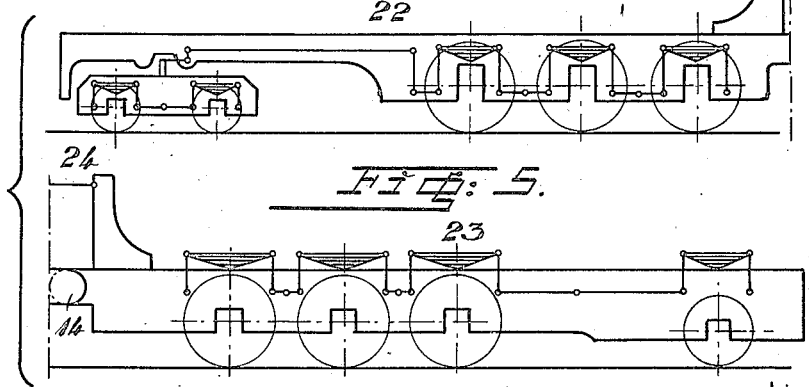
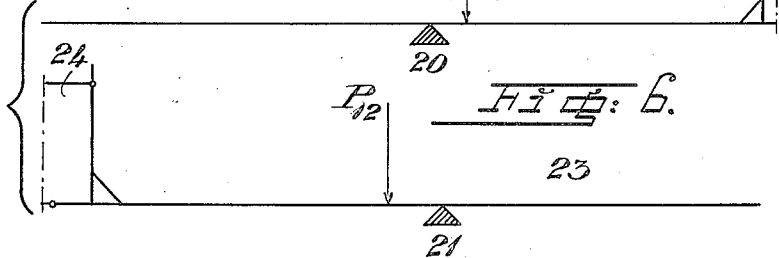
Inventor
I. Broberg,
By Marks&Clerk
Attys Patented May 29, 1923.

1,456,587

UNITED STATES PATENT OFFICE.

ISIDOR BROBERG, OF SKARSATRA, LIDINGON, SWEDEN, ASSIGNOR TO AKTIEBOLAGET LJUNGSTRÖMS ANGTURBIN, OF STOCKHOLM, SWEDEN, A CORPORATION.

BALANCING DEVICE BETWEEN TWO COUPLED CARRIAGES FOR EFFECTING DESIRED WHEEL PRESSURE.

Application filed April 13, 1922. Serial No. 552,372.

*To all whom it may concern:*

Be it known that I, ISIDOR BROBERG, engineer, a subject of the King of Sweden, residing at Skarsatra, Lidingon, Sweden, have invented certain new and useful Improvements in Balancing Devices Between Two Coupled Carriages for Effecting Desired Wheel Pressure, of which the following is a specification.

In two coupled carriages, as for instance a locomotive and a tender, two halves of an electric double locomotive or the like, the wheel pressures in each carriage are determined by the position of the centers of gravity of the carriages under the presumption that both carriages are vertically movable in relation to each other. It will frequently prove very difficult to realize the position of the centers of gravity necessary for the desired distribution of the wheel pressures. Thus for instance in a steam locomotive provided with four wheel bogies, three driving shafts and one running shaft, it will frequently be necessary to give the whole furnace a shape unsuitable for the manufacture in order that it may be positioned as far forward as possible above the driving wheels for the purpose of maintaining the load on the last shaft or shafts within allowed bounds.

This invention relates to a balancing device for obtaining desired wheel pressures in two coupled carriages in cases where the position of the center of gravity of each carriage does not permit the realization of such wheel pressures when the carriages are separated from each other. The invention consists in that between the carriages a device is provided which effects a power having substantially horizontal direction and its points of application situated on the carriages above or below the coupling device of the latter.

The invention is clearly illustrated in the accompanying drawings, in which:—

Fig. 1 is a side elevational view of a locomotive and tender arranged in accordance with one method of carrying out this invention, Fig. 2 is a diagrammatic view of the arrangement shown in Fig. 1 indicating the mathematical supporting points, Fig. 3 is a side elevational view of a modified arrangement, Fig. 4 is a diagrammatic view of the arrangement shown in Fig. 3, Fig. 5 is a side elevational view of a further modification, and Fig. 6 is a diagrammatic view of the modification shown in Fig. 5.

Referring to Fig. 1, the same illustrates above a carriage which can consist of the steam locomotive of certain type mentioned above in case the wheels 1, 2 and 3 are supposed to be driving wheels. Said driving wheels together with the rear running wheel 4 are supported by the same spring system, while the fore bogie of the same carriage possesses its own spring system. The coupled carriage below in the same figure, in this case the tender, is supported by two bogies 6 and 7 each of which has its own spring system.

Fig. 2 illustrates diagrammatically the same device as Fig. 1, the reference numerals 8, 9, 10 and 11 representing the mathematical supporting points of the spring system, it being possible to determine said supporting points by the joint devices of the spring system. If, as shown in the figure, a spring device be inserted producing a power Q between the carriages, it will appear immediately that a compressive force acting in said spring will effect a decreased load of the supports 9 and 10 and an increased load of the supports 8 and 11. In case of a tensile force acting in the spring device it is the contrary. Of course the common center of gravity of both carriages will not be changed by such change of the wheel pressures of both carriages, but the resultant of the wheel pressures in each carriage will no more coincide with the center of gravity of the carriage. Consequently if both carriages be so constructed that their common center of gravity coincides with the resultant of the desired wheel pressures and naturally in such manner that the weight of each carriage is equal to the sum of the desired wheel pressures of the carriages, the desired distribution of the wheel pressures may always be realized by a balancing device placed between the carriages, this being, of course, a far easier problem than a correct placing of the center of gravity of each carriage.

In an electric double locomotive consisting of two equal halves oppositely directed the above-mentioned conditions of construction are fulfilled by themselves, and on account thereof in such a locomotive the wheel pressures may, as desired, quite independent of the position of the centers of gravity of the two halves, be distributed symmetrically on either side of the middle of the locomotive by the use of an intermediate balancing device.

In some carriages, as for instance turbo-locomotives having the boiler on one carriage and the driving engine on the other one and in which the steam conduit consequently has to be conducted from one carriage to the other one, it is most suitable to construct the coupling in such a manner that it receives forces both in horizontal and vertical directions, the carriages in such case not being freely movable in vertical direction in relation to each other. In order that the wheel pressures under such circumstances be not changed at uneven positions of the rails and the like one of the carriages ought to be supported by a single spring system on each side.

Fig. 3 illustrates how the right, rear carriage 12 is supported by a single spring system, whereas the left, fore carriage 13 is supported by two spring systems. Said carriages are coupled by means of a joint 14 preventing the carriages from moving vertically in relation to each other.

Fig. 4 shows more diagrammatically the same thing, 15, 16 and 17 representing the mathematical supporting points of the spring systems adapted to be determined by such spring systems. It will appear therefrom that, if the carriages be disconnected, the carriage 12 is supported by the wheels with unstable equilibrium, whereas the support of the carriage 13 is stable. Also in this case, while maintaining the position of the center of gravity common to both carriages, the wheel pressures may be distributed in such manner that in each carriage the resultant of the wheel pressures does not coincide with the center of gravity of the corresponding carriage. Supposing 17 to be the desired position of the mathematical supporting point in the carriage 12 and P the position of the center of gravity of the spring supported weight, the load will be divided into two components; $P_1$ in the point 17 and $P_2$ in the joint 14. The latter component will give at the supposed position of P an extra load in the point 16 and unloading in the point 15 in the left carriage. If P be positioned to the right of the supporting point 17, it will be the contrary. If a force Q be introduced, effected according to the Figure by a spring placed between the carriages, the supporting point 17, while using the left carriage as support, may be loaded to the desired pressure, that is to say, the component $P_2$ in the joint 14 may be decreased, if the force Q effects pressure between the carriages, and increased, if Q effects tension.

It has been supposed above that the position of the center of gravity common to both carriages coincides with the resultant of all the desired wheel pressures, and it has been proved that in the carriage 12 supported with unstable equilibrium the resultant of the wheel pressures may obtain the desired position, by adjusting suitably the spring balancing devices, and desired magnitude by a suitably adjusted spring. Hence it follows that the wheel pressures on the spring system 15 and 16 also obtained the desired magnitude. If the carriages be coupled so as to be rigidly connected in vertical direction, it is not necessary that the weight of each carriage be equal to the sum of the wheel pressures of each carriage. Consequently it will be possible by displacing the center of gravity of one carriage to compensate for the unsuitable position of the center of gravity of the other one. A locomotive being relatively heavy at the rear part may for instance obtain the desired wheel pressures by being provided with a tender being relatively heavy at the fore part and with a suitably adjusted pressure spring located above the coupling between the carriages.

Of course, the force Q necessary for the balancing operation may be effected in various manners, as for instance by a single spring, a spring with transmission, balancing of the spring system of the carriage, tensile joints etc. The last named method of balancing is illustrated in Fig. 3 by the stippled tensile rods 18 by the aid of which the whole spring system of the carriage 12 and the rear part of the carriage 13 may be balanced.

Supposing as above that the center of gravity common to both carriages coincides with the resultant of the desired wheel pressures, but that for each carriage per se the resultant of the wheel pressures and the center of gravity do not coincide, the distribution of the wheel pressures may according to the principle of the invention, be effected by two carriages supported with unstable equilibrium on their spring systems. Fig. 5 illustrates two carriages coupled in said manner, each carriage when disconnected being supported with unstable equilibrium by its spring system. Fig. 6 shows the same thing more diagrammatically, 20 and 21 being the mathematical supporting points which in each separate carriage by adjusting suitably the spring balancing devices of the spring system may be fixed to the desired position. Supposing the two carriages 22 and 23 to be coupled by a rigid connection 24 in the shape of a rod or the like, it will appear immediately that, as the center of gravity common to both carriages coincides with the position of the resultant of the desired wheel pressures and the resultant for the resilient part of each carriage coincides as to the position with the mathematical supporting point of the spring system, the wheel pressures will necessarily be the desired ones. In the position of the supporting points of the spring system as well as of the centers of gravity of the resilient weights shown in Fig. 6, the rigid connection, the rod 24, receives a pressure force, the moment of which in relation to the hinge point balances the moment of the weights in relation to the supporting points of the spring system. The rod 24 should not be rigidly connected with both carriages but be caused to bear against support comprising a spring having greater tension than the force acting in the rod, since, when using a rigid connection, the whole device or at least the frame-work may be damaged in case of derailment or passage on rails so badly placed that the axle bearings are struck.

Obviously the carriages coupled as described above may be varied in several manners without deviating from the principle of the invention.

What I claim as new and desire to secure by Letters Patent of the United States is:—

1. A vehicle comprising two parts arranged one behind the other in the direction of movement and fixedly connected to each other, means located between said parts for obtaining the desired wheel pressures in the parts of the vehicle and including a resilient member producing on the running of the vehicle a substantially horizontal force having its points of application positioned in the parts of the vehicle adjacent the fixed connection between the said parts.

2. A vehicle in accordance with claim 1 wherein a spring system is employed for supporting one of the parts of the vehicle in unstable equilibrium.

3. A vehicle in accordance with claim 1 wherein the parts of the vehicle are arranged so that the center of gravity of one of said parts is positioned on the side of the resulting wheel pressure of the other of said parts.

4. A vehicle in accordance with claim 1 wherein the parts of the vehicle are so connected that one part partially supports the other.

5. A vehicle comprising two parts arranged behind each other in the direction of movement and fixedly connected to each other, spring systems for supporting both parts of the vehicle in unstable equilibrium, means located between said parts for obtaining the desired wheel pressures in the parts and including a yielding coupling for producing on the running of the vehicle a substantially horizontal force having its points of application positioned in the parts adjacent the fixed connections therebetween.

In testimony whereof I affix my signature in presence of two witnesses.

ISIDOR BROBERG.

Witnesses:
S. SWENSON,
TOM FALK.